United States Patent [19]

Krätzschmar et al.

[11] Patent Number: 5,683,622

[45] Date of Patent: Nov. 4, 1997

[54] OPTICAL ELEMENTS HAVING COLOR-SELECTIVE AND POLARIZATION-SELECTIVE REFLECTION CONTAINING LC PIGMENTS, AND THE PRODUCTION OF THESE ELEMENTS

[75] Inventors: Oliver Krätzschmar; Thilo Gebhard, both of München; Silvia Ehmann, Puchheim; Franz-Heinrich Kreuzer, Martinsried, all of Germany

[73] Assignee: Consortium für elektrochemische Industrie GmbH, München, Germany

[21] Appl. No.: 435,546

[22] Filed: May 5, 1995

[30] Foreign Application Priority Data

Jun. 1, 1994 [DE] Germany ............... 44 19 239.8

[51] Int. Cl.⁶ ............... G09K 19/52; F21V 9/14
[52] U.S. Cl. ............... 252/299.01; 252/585
[58] Field of Search ............... 252/299.01, 585; 359/885, 886, 93, 100, 101; 349/194

[56] References Cited

U.S. PATENT DOCUMENTS

| | | | |
|---|---|---|---|
| 3,679,290 | 7/1972 | Adams et al. | 359/37 X |
| 3,942,871 | 3/1976 | Saeva | 359/37 X |
| 4,388,453 | 6/1983 | Finkelmann et al. | 528/15 |
| 4,410,570 | 10/1983 | Kreuzer et al. | 427/374.1 |
| 4,637,896 | 1/1987 | Shannon | 252/299.7 |
| 4,688,901 | 8/1987 | Albert | 359/52 X |
| 4,780,383 | 10/1988 | Garrett et al. | 430/11 |
| 5,211,877 | 5/1993 | Andrejewski et al. | 252/299.01 |
| 5,362,315 | 11/1994 | Miller-Rees et al. | |
| 5,364,557 | 11/1994 | Faris . | |

FOREIGN PATENT DOCUMENTS

| | | |
|---|---|---|
| 0066137 | 12/1982 | European Pat. Off. . |
| 0358208 | 3/1990 | European Pat. Off. . |
| 0383376 | 8/1990 | European Pat. Off. . |
| 3110048 | 9/1982 | Germany . |
| 3604757 | 9/1986 | Germany . |
| 9508786 | 3/1995 | WIPO . |

OTHER PUBLICATIONS

R. Maurer, D. Andrejewski, F.H. Kreuzer, A. Miller, "Polarizing Color Filters made from Cholesteric LC Silicones", SID Digest 1990, pp. 110–113.

M.L. Tsai, S.H. Chen, S.D. Jacobs, "Optical Notch Filters Using Thermotropic Liquid Crystalline Polymers", Appl. Phys. Lett. 1989, 23 (54), pp. 2395–2397.

H. Kelker, R. Hatz, "Handbook of Liquid Crystals", Verlag Chemie, Weinheim, 1980, Chapter 7, pp. 293 ff).

D.J. Broer et al. 14th Int. Liquid Conf., Abstract II. 921 (1992).

CA113 (22), 201523y.
CA113 (14), 124523u.
CA112 (18), 169216s.
CA112 (16), 149138q.
CA112 (4), 21552c.
CA111 (16), 144258y.
CA111 (4), 24780r.

C.G. Roffey, Photopolymerisation of Surface Coatings, (1982), John Wiley & Sons, Chichester, pp. 137–208.

De Visser et al., J. Polym. Sci., A 1 (9), 1893, (1971) "Thermal Bulk Polymerization of Cholesteryl Acrylate".

*Primary Examiner*—Philip Tucker
*Attorney, Agent, or Firm*—Collard & Roe, P.C.

[57] ABSTRACT

Wavelength-selective and polarization-selective optical elements contain pigments embedded in a transparent binder, in which the pigments include at least one three-dimensionally crosslinked substance having a liquid-crystalline structure with a chiral phase.

5 Claims, No Drawings

OPTICAL ELEMENTS HAVING COLOR-SELECTIVE AND POLARIZATION-SELECTIVE REFLECTION CONTAINING LC PIGMENTS, AND THE PRODUCTION OF THESE ELEMENTS

BACKGROUND OF THE INVENTION

1. Field of the Invention

The present invention relates to optical elements having color-selective and polarization-selective reflection containing (liquid crystal) LC pigments, and the production of these optical elements.

2. The Prior Art

The use of cholesteric liquid crystals for the production of color filters and polarizers is disclosed, for example, in U.S. Pat. No. 3,679,290 and by R. Maurer, D. Andrejewski, F. H. Kreuzer, A. Miller, "Polarizing Color Filters Made From Cholesteric LC Silicones" SID Digest 1990, pp. 110–113, and M. L. Tsai, S. H. Chen, S. D. Jacobs, "Optical Notch Filters Using Thermotropic Liquid Crystalline Polymers", Appl. Phys. Lett. 1989, 24 (54), pp. 2395–2397.

By means of suitable alignment methods, cholesteric liquid crystals can be converted into a twisted structure having a pitch which depends on the type and composition of the liquid crystal. The direction of rotation can be either left-handed or right-handed, depending on the chiral component used. This twisted arrangement of the liquid crystal molecules results in the known selective reflection of the cholesteric liquid crystals (see, for example, H. Kelker, R, Hatz, "Handbook of Liquid Crystals" Verlag Chemie, Weinheim, 1980, Chapter 7, pp. 293 ff): circular-polarized light whose wavelength and direction of rotation agree with the pitch of the liquid crystal is totally reflected. Circular-polarized light with the opposite direction of rotation or with a different wavelength can pass unhindered through the cholesteric liquid crystal. Accordingly, only a narrow circular-polarized band in white unpolarized light, which contains all wavelengths and polarization states, is reflected.

Cholesteric liquid crystals can therefore be employed as wavelength-selective reflectors or polarizers. In particular, the possibility of being able to achieve reflection wavelengths from the near-ultraviolet to well into the infra-red wavelength range through a suitable choice of the type and content of the chiral groups in the cholesteric liquid crystal is also an extraordinary advantage of cholesteric liquid crystals.

For the production of optical components, it is necessary to align the cholesteric liquid crystals suitably and subsequently to fix this alignment. The alignment is usually carried out at elevated temperature in the region of the cholesteric phase by shearing a liquid-crystal layer with a thickness of about 5–25 μm between glass plates. For adequate alignment, the glass plates carry alignment layers, usually of rubbed polyimide or polyvinyl alcohol, or electric or magnetic fields are used. In order to ensure low viscosity, the processing temperature is usually a few ° C. below the clearing point, particularly at 80°–160° C. The alignment is fixed either by photochemical crosslinking or by using materials having glass transition temperatures above 50° C.

This type of production is associated with a number of problems which have hitherto prevented the widespread use of these filters. Particular mention should be made of the restriction to areas of a few square cm and the extreme difficulty in automating production. The restriction to glass plates or other mechanically stable substrates means that the filters are heavy and in addition prevents production of filters with a wide curvature or flexibility latitude.

Another as yet unsolved problem is the production of multilayer systems, which are required for broad-band polarizers, polarization-independent color filters or for filters having particular characteristics, for example so-called notch filters. For these applications, layers having either different reflection wavelengths or different directions of rotation of circular-polarized light must be combined.

SUMMARY OF THE INVENTION

The invention relates to wavelength-selective and polarization-selective optical elements containing pigments embedded in a transparent binder, wherein the pigments comprise at least one three-dimensionally crosslinked substance having a liquid-crystalline structure with a chiral phase.

The invention furthermore relates to processes which enable simple production of even large-area, curved or flexible optical components based on cholesteric liquid crystals. These processes comprise applying the pigments containing at least one three-dimensionally crosslinked substance having a liquid-crystalline structure with a chiral phase in transparent binder systems to any desired surfaces.

Pigments containing at least one three-dimensionally crosslinked substance having a liquid-crystalline structure with a chiral phase are referred to below as LC pigments (LC=liquid crystal).

In a preferred embodiment, the LC pigments consist exclusively of an interference layer comprising aligned, three-dimensionally crosslinked liquid-crystalline substances having a chiral phase. The colored nature of these pigments is thus based exclusively on an interference effect. The light reflected by these pigments is circular-polarized.

In another embodiment, the LC pigments contain other dyes in addition to the aligned, three-dimensionally crosslinked liquid-crystalline substances having a chiral phase. Suitable dyes are soluble in the non-polymerized starting substances for the preparation of the novel pigments.

The LC pigments contain no support material to which the aligned, three-dimensionally crosslinked liquid-crystalline substances having a chiral phase have been applied.

The LC pigments are obtainable by aligning three-dimensionally crosslinkable liquid-crystalline substances having a chiral phase, if desired after admixture of further dyes, three-dimensionally crosslinking the aligned substances and comminuting the crosslinked substances to the desired particle size.

The three-dimensionally crosslinkable liquid-crystalline substances having a chiral phase are preferably applied to a substrate, crosslinked on this substrate and removed from the substrate after the crosslinking.

Liquid-crystalline substances which are suitable as starting substances for the preparation of the LC pigments have a twisted structure with a pitch which corresponds to a wavelength of light in the range from UV to IR. This structure is found, for example, in cholesteric liquid crystals. Cholesteric liquid crystals, or generally liquid-crystalline substances having a chiral phase with a twisted structure having a desired pitch, can be obtained from nematic, smectic or diskotic structures by adding a chiral substance. The type and amount of chiral substance determine the pitch of the twisted structure and thus the wavelength of the reflected light. The twist of the structure can be either left-handed or right-handed. In addition, the starting substances must contain groups which are polymerizable, polycondensable or susceptible to polyaddition, and at least some of which must be in the form of di-, tri-, or polyfunctional units. Examples of such groups are methacryloxy and acryloxy groups.

Suitable materials and their preparation are described, for example, in DE-C2-3,604,757, EP-A2-358,208, EP-A-0 066 137 (corresponding to U.S. Pat. No. 4,388,453) and in the references cited by D. J. Broer et al in the 14th Int. Liquid Conf., Abstracts II. 921 (1992).

Three-dimensionally crosslinkable polyorganosiloxanes as described in EP-A-358,208 are particularly suitable.

However, the starting materials for the preparation of the LC pigments can in principle be any type of cholesteric liquid crystals. It is possible to use one type of cholesteric liquid crystal, or alternatively a mixture of at least two of these liquid crystals; it is possible to use a single dye or alternatively mixtures of at least two dyes.

The dye to be employed in the process for the preparation of the LC pigments is, in a further preferred embodiment, soluble in the liquid crystal (mixture) employed. Preference is given in the novel process not to a mixture of a plurality of cholesteric liquid-crystalline substances, but rather to a single, pure cholesteric liquid-crystalline substance.

The dyes are admixed with the other starting substances in a conventional manner, for example by stirring. The admixing of these substances has no effect on the other process steps for the preparation of LC pigments.

A particular desired pigment color can also be obtained by mixing defined liquid-crystal base mixtures in suitable mixing ratios. In this case too, there is no effect on the other process steps for the preparation of the novel pigments. The remainder of the description of the preparation process therefore applies to all variants of the novel pigments.

Liquid crystals having twisted phases only form their optical properties when the individual molecules are arranged in layers and are uniformly ordered within a layer. The molecules change their preferential direction from layer to layer, so that helical structures are formed. In order to achieve this, the molecules are aligned by known methods, for example, by alignment layers or by means of electric or magnetic fields. Such methods are disclosed, for example, in the following references: CA113 (22), 201523y; CA113 (14), 124523u; CA112 (18), 169216s; CA112 (16), 149138q; CA112 (4), 21552c; CA111 (16), 144258y; CA111 (4), 24780r.

In the preparation of the LC pigments, the above starting substances are aligned in a known manner. This can be accomplished, for example, by knife-coating onto a metal, plastic or glass substrate. This substrate can, if necessary, have been provided with an alignment layer, for example of polyimide or polyvinyl alcohol. It can also have been silanized for this purpose. However, it is also possible to shear the starting substance between two films. One or two polyethylene terephthalate films are preferably used.

The knife-coating of the liquid-crystalline polyorganosiloxanes onto a film is disclosed, for example, in EP-A-358, 208.

The aligned liquid-crystalline substances are crosslinked as known from the prior art for the particular material. Thus, for example, liquid-crystalline polyorganosiloxanes can be thermally crosslinked by the process described in EP-A-66, 137. The liquid-crystalline polyorganosiloxanes described in EP-A-358,208 can be three-dimensionally crosslinked photochemically, for example by irradiation with UV light. A review of photochemical crosslinking processes for aligned starting materials is given in C. G. Roffey, Photopolymerisation of Surface Coatings, (1982), John Wiley & Sons, Chichester, pp. 137–208.

The crosslinked, aligned liquid-crystalline substances having a chiral phase are, if desired, removed from the substrate. If a film is used as substrate, the mechanical removal of the brittle, crosslinked liquid crystals from the substrate can be carried out, for example, by passing the substrate over a deflection roll of small diameter. This causes the crosslinked material to flake off from the film. However, any other method by means of which the polymerized material can be removed from the substrate is just as suitable.

The aligned, three-dimensionally crosslinked, unsupported liquid-crystalline material is comminuted to the particular desired particle size. This can be carried out, for example, by grinding, for example in a universal mill. Depending on the desired use of the pigments, particle diameters from about 10 mm to 1 µm can be produced. The pigments preferably have a particle size of from 5 mm to 5 µm. The pigments have a thickness of from 1 to 100 µm, preferably from 5 to 50 µm.

In order to narrow the particle size distribution, the ground material can subsequently be classified, for example, by a sieving process.

Owing to its color-selective reflection and polarization-selective reflection, each LC pigment particle can be regarded as a color filter and/or polarizer. As a consequence of their geometry (platelet form) the individual pigment particles can be aligned parallel to one another during processing. A layer of aligned LC pigments of this type in a transparent binder therefore has the same optical properties as an optical element produced in a conventional manner from cholesteric liquid crystals.

The invention therefore also relates to the use of LC pigments as color filters and/or polarizers.

The LC pigments can be mixed with one another as desired.

Optical components containing LC pigments are produced by mixing the pigments having the desired properties (reflection color, polarization direction) with a suitable binder system.

All known transparent binder systems are suitable.

Preference is given to polymerizable resins (UP resins, silicone resins, epoxy resins), dispersions, solvent-containing paints or water-based paints, polymerizable LC silicones and all transparent plastics, for example polyvinyl chloride, polymethyl methacrylate and polycarbonate. Binder systems whose refractive index corresponds to that of the particular LC pigments employed are particularly suitable.

For applications in which the light transmitted by the optical element is required, the binder must be transparent, but dyes can also be dissolved in the binder in order to achieve specific optical properties.

For applications in which the light reflected by the optical element is required, the binder can also contain organic or inorganic pigments which absorb the light not reflected by the LC pigments. However, the optical elements preferably contain no further organic or inorganic pigments besides the LC pigments.

Light scattering by the optical elements can be greatly reduced by using binders whose refractive index corresponds to that of the LC pigments.

The particle size of the LC pigments can be chosen as desired for the production of the optical elements. The pigments are employed in amounts of 1–90% by weight, based on the LC pigment/binder mixture, depending on the degree of covering desired.

The pigment/binder mixture can be applied to a suitable substrate by spraying, dipping, brushing, knife-coating, spincoating or the like, depending on the viscosity of the system, by methods known from the prior art.

The degree of covering can be increased by applying a plurality of layers of LC pigments to a suitable substrate. The novel optical elements preferably have a degree of covering of 1. For the purposes of the invention, degree of covering is taken to mean the quotient of the area of the optical element covered by pigments and the area of the optical element covered by the mixture of binder and LC pigment.

An additional pigment-free top coat increases the surface quality of the optical element and reduces light scattering.

Suitable substrates in optical elements for transmission applications are all transparent materials. Examples of such materials are glass, quartz, and transparent plastics. These materials are preferably employed in the form of sheets or films.

There are no restrictions concerning substrates in optical elements for reflection applications, but preference is given to absorbent substrates which absorb the light not reflected by the pigments. For use as beam splitters, transparent substrates are used.

If left-handed and right-handed circular-polarizing LC pigments of the same reflection wavelength are mixed, light is totally reflected in the region of the reflection band of these LC pigments, irrespective of its polarization state. The possible spectral range extends from ultra-violet to infrared, depending on the reflection color of the pigment used.

For the production of novel color filters, LC pigments are employed which reflect all wavelengths apart from the particular ones desired. For example, mixing blue and red, right-handed and left-handed circular-polarizing pigments gives a color filter which allows green light to pass through.

By using pigments of different color, but the same polarization direction, a broad-band circular polarizer is obtained, since this mixture only reflects or transmits circular polarization independently of wavelength. Filters having a specific characteristic line, for example notch filters, can be produced analogously.

A great advantage of the invention is the simple application, even by machine in a continuous process, of the mixture of LC pigments and binders to large surfaces, even those with any desired degree of curvature.

The use of the LC pigments allows all the problems associated with direct processing of liquid-crystalline substances and crosslinking of these substances to be overcome. Neither alignment layers nor electric or magnetic fields are required. The LC pigments are applied to the particular substrate by common methods, for example, by spraying, brushing, dipping or spin coating. However, any other process for the production of thin coatings is just as suitable.

Other objects and features of the present invention will become apparent from the following Examples, which disclose the embodiments of the present invention. It should be understood, however, that the Examples are designed for the purpose of illustration only and not as a definition of the limits of the invention.

The following examples serve to illustrate the invention in greater detail.

EXAMPLE 1

Polyorganosiloxanes Having Methacrylic Acid-Containing Side Chains

A solution of 233 g of cholesteryl 4-(prop-2-en-1-oxy) benzoate (obtainable as described in DE-A 3,110,048, 178 g of 4-trimethylsiloxyphenyl 4-(prop-2-en-1-oxy)benzoate (obtainable as described in EP-A-358,208, page 9, Section C) and 56.9 g of tetra-methylcyclotetrasiloxane in 400 ml of toluene was refluxed for 1 hour in the presence of 24 mg of dicyclopentadienylplatinum dichloride and, after addition of a solution of 1.2 g of NaOH in 50 ml of ethanol, for a further 7 hours in order to cleave the silyl ether. The reaction mixture was concentrated to $\frac{1}{3}$ of its volume in a rotary evaporator, 7.5 g of p-toluenesulfonic acid and 154 g of methacrylic anhydride were added, and the mixture was warmed at 100° C. for 1 hour. After the volatile constituents had been removed by distillation, the product was re-precipitated twice using methylene chloride/ethanol.

The product had the following physical and thermodynamic data: Glass transition temperature 14° C., clearing point 141° C.

B: preparation of a Pigment 4 g of the polyorganosiloxane prepared as described in A were warmed to 70° C. and homogeneously mixed with 0.11 g of 2-methyl-1-[4-(methylthio) phenyl]-2-morpholino-1-propanone (obtainable under the name Irgacure 907 from Ciba Marienberg GmbH, 6140 Bensheim 1, Germany) with stirring. A viscous LC composition with a reddish shimmer was obtained. The liquid-crystalline material was knife-coated in a coating thickness of 15 µm at 120° C. onto a polyethylene terephthalate film (Hoechst AG, Films Business Area, 6200 Wiesbaden 1, Germany), the film being moved under the fixed knife at a speed of about 2 m/min. At the same time, the shear gradient between knife and film caused alignment of the liquid-crystalline molecules, which was evident from a red coloration of the liquid-crystal layer. This layer was subsequently irradiated for 5 seconds with a mercury discharge lamp (80 W/cm) and thus three-dimensionally crosslinked. The coating formed on the film was tack-free and brittle in the hot and cold states. It had a reflection wavelength of 560 nm. (Angle of incidence and viewing angle 45°, see FIG. 1). The mechanical removal of the liquid-crystalline material obtained in this way from the substrate was achieved by passing the film over a deflection roll with a diameter of 10 cm, causing the crosslinked material to flake off from the support. The grinding of the crosslinked, substrate-free material was carried out in a universal mill. Grinding of the crosslinked polyorganosiloxanes obtained predominantly in leaf form (size: a few millimeters to centimeters) for 5 minutes gave a pulverulent fraction. The ground material was then subjected to a screening process in order to narrow the particle size distribution. To this end, the ground pigments were screened by means of an analytical screen having a mesh width of 100 µm.

EXAMPLE 2

A: Preparation of a Blue Liquid-Crystal Mixture 6 g of polyorganosiloxane were prepared as described in Example 1 and dissolved in 50 ml of toluene. 2.6 g of cholesteryl methacrylate (prepared as described in De Visser et al., J. Polym. Sci., A 1 (9), 1893 (1971)) and 9 mg of aluminum cupferron (obtainable under the name Q1301 from Wako Chemicals GmbH, 4040 Neuss, Germany) were added to this solution. The toluene was then removed in vacuo at 70° C. in a rotary evaporator, giving a viscous LC composition having the following physical and thermodynamic data: Glass transition temperature 4° C., clearing point 132° C.

B: preparation of a Pigment 4 g of the LC composition prepared as described above in part A were warmed to 70° C. and homogeneously mixed with 0.11 g of 2-methyl-1-(4-(methylthio)phenyl)-2-morpholino-1-propanone (obtainable under the name Irgacure 907 from Ciba Marienberg GmbH, 6140 Bensheim 1, Germany) with stirring. The liquid-crystalline material was treated further as described above in part B in Example 1, it being applied to the film at a temperature of 80° C. and photochemically crosslinked. The coating produced on the film had a reflection wavelength of nm. The pigments had an intense blue color.

EXAMPLE 3

Preparation of a Polymerizable Monomer:

4-Ethylphenyl Methacryloxybenzoate

A solution of 16.9 g of 4-ethylphenyl 4-trimethylsilyloxybenzoate (prepared as described in EP-A-358,208, page 9, Section C) in 15 ml of toluene and 10 ml of ethanol was refluxed for 1 hour and subsequently freed from volatile constituents by heating at 100° C. for 60 minutes. 13.3 g of 4-ethylphenyl 4-hydroxybenzoate which remained were dissolved in 15 ml of toluene together with 30 g of methacrylic anhydride and 1.2 g of toluenesulfonic acid, and the mixture was warmed at 100° C. for 1 hour. After cooling, the product was precipitated using hexane and recrystallized from ethanol.

B: preparation of a Red Liquid-Crystal Mixture 6 g of the polyorganosiloxane prepared as described in Example 1A were dissolved in 50 ml of toluene. 1.5 g of 4-ethylphenyl methacryloxybenzoate (prepared as in Example 3A) and 7.5 mg of aluminum cupferron (obtainable under the name Q1301 from Wako Chemicals GmbH, 4040 Neuss, Germany) were added to this solution. The toluene was then removed in vacuo at 70° C. in a rotary evaporator, giving a viscous LC composition having the following physical and thermodynamic data: Glass transition temperature −2° C., clearing point 124° C.

C: preparation of a Pigment

The resultant mixture was treated as described in Example 2B. The coating formed on the film had a reflection wavelength of 630 nm. Pigments having an intense red color were obtained.

EXAMPLE 4

Preparation of a Green Liquid-Crystal Mixture 2.8 g of the red color mixture (prepared as described in Example 3B), 1.2 g of the blue color mixture (prepared as described in Example 2A) and 0.11 g of 2-methyl-1-[4-(methylthio)phenyl]-2-morpholino-1-propanone (obtainable under the name Irgacure 907 from Ciba Marienberg GmbH, 6140 Bensheim 1, Germany) were homogeneously mixed with stirring, giving a viscous LC composition with a greenish shimmer which had the following thermodynamic data: Glass transition temperature 2° C., clearing point 128° C.

B: preparation of a Pigment

The resultant mixture was further treated as described in Example 2B by application to a film at a temperature of 80° C. followed by photochemical crosslinking. The coating formed on the film had a reflection wavelength of 530 nm. Pigments having an intense green color were obtained.

EXAMPLE 5

20 parts by weight of an LC pigment which reflects green left-handed circular-polarized light, as described in Example 4 (particle size fraction 100–160 µm), were mixed intimately with 80 parts by weight of a UP resin (Vestopal 400, Hüls AG) to which a curing agent (Cyclonox BT-50, Akzo) and co-accelerator (1%) had been added as stipulated in the relevant instructions. Shearing between two glass plates gave an approximately 50 µm film containing pigment particles aligned essentially parallel to the glass plates, which was cured as described in the instructions from Hüls AG.

On perpendicular incidence of light, this optical element exhibits a green reflection color, which shifts toward blue with increasing viewing angle. When observed in the transmitted light, it appears violet on irradiation with white, left-handed circular-polarized light, but colorless on irradiation with white, right-handed circular-polarized light.

EXAMPLE 6

20 parts by weight of green LC pigment were mixed with 80 parts by weight of liquid-crystalline siloxane (obtainable under the name CS4000A from Wacker-Chemie GmbH, Munich, Germany) and 2 parts by weight of photoinitiator (obtainable under the name Irgacure 907 from Ciba AG) at 140° C. Shearing between glass plates gave an approximately 50 µm film containing pigment particles aligned substantially parallel to the glass plates. This film was photochemically crosslinked by UV irradiation (20 mW/cm$^2$, 60s).

This film possessed the same properties as the optical element described in Example 5.

EXAMPLE 7

An unsaturated polyester resin (obtainable under the name Vestopal 400 from Hüls AG) was diluted with 50% of styrene and mixed with curing agent (Cyclonox BT-50, Akzo) and coaccelerator (1%) in accordance with the instructions from Hüls AG enclosed with the polyester resin. 80 parts by weight of this mixture was mixed with 20 parts by weight of green LC pigments.

Spin coating (1000 rpm, 10s) of this mixture on a glass plate gave a thin film containing pigment particles aligned virtually exclusively parallel to the glass surface. The film was cured as described in the instructions from Hüls AG. The surface can be smoothed by application of a pigment-free top coat of resin, thus reducing scattering.

This film possesses the same optical properties as the optical element described in Example 5.

While several embodiments of the present invention have been shown and described, it is to be understood that many changes and modifications may be made thereunto without departing from the spirit and scope of the invention as defined in the appended claims.

What is claimed is:

1. A wavelength-selective and polarization-selective optical element comprising a transparent binder containing pigments embedded therein; and wherein the pigments comprise at least one three-dimensionally crosslinked substance having a liquid-crystalline structure (LC) with a chiral phase; and wherein refractive index of the transparent binder is equal to that of the LC pigments.

2. A process for the production of optical components, comprising providing a substrate; and applying pigments containing substance having a liquid-crystalline (LC) structure with a chiral phase in transparent binder systems to said substrate; and wherein refractive index of the transparent binder is equal to that of the LC pigments.

3. A process for the production of wavelength-selective and polarization-selective optical components, comprising mixing pigments having the properties of color reflection and polarization direction with a suitable transparent binder system; and polymerizing the transparent binder to produce an optical element containing at least one three-dimensionally crosslinked substance having a liquid-crystalline structure with a chiral phase; and wherein the refractive index of the transparent binder is equal to that of the liquid-crystalline structure.

4. In a method of providing a color filter, the improvement which comprises utilizing pigments containing at least one three-dimensionally crosslinked substance having a liquid-crystalline structure (LC) with a chiral phase embedded in a transparent binder; and wherein refractive index of the transparent binder is equal to that of the LC pigments, as said color filter.

5. In a method of providing a polarizer, the improvement which comprises utilizing pigments containing at least one three-dimensionally crosslinked substance having a liquid-crystalline structure (LC) with a chiral phase embedded in a transparent binder; and wherein refractive index of the transparent binder is equal to that of the LC pigments, as said polarizer.

* * * * *